United States Patent [19]

Lee et al.

[11] Patent Number: 5,684,887
[45] Date of Patent: Nov. 4, 1997

[54] BACKGROUND RECOVERY IN MONOCULAR VISION

[75] Inventors: Cheoung N. Lee; Sumitro Samaddar, both of Plainsboro, N.J.

[73] Assignee: Siemens Corporate Research, Inc., Princeton, N.J.

[21] Appl. No.: 451,620

[22] Filed: May 26, 1995

Related U.S. Application Data

[63] Continuation of Ser. No. 87,224, Jul. 2, 1993, abandoned.
[51] Int. Cl.$^6$ ............................. G06K 9/00; H04N 5/14
[52] U.S. Cl. ............................ 382/107; 348/586; 348/700
[58] Field of Search ........................... 382/107, 103, 382/173, 270; 395/105, 135; 348/699, 700, 701, 586, 413

[56] References Cited

U.S. PATENT DOCUMENTS

| | | | |
|---|---|---|---|
| 3,746,782 | 7/1973 | Driskell | 348/586 |
| 4,969,039 | 11/1990 | Koga et al. | 358/335 |
| 5,243,418 | 9/1993 | Kuno et al. | 382/107 |
| 5,259,040 | 11/1993 | Hanna | 382/41 |
| 5,262,856 | 11/1993 | Lippmann et al. | 358/136 |
| 5,274,453 | 12/1993 | Maeda | 348/700 |
| 5,307,162 | 4/1994 | Schowengerdt | 348/123 |

OTHER PUBLICATIONS

Pattern Recognition, vol. 23, No. 12, 1990 US, pp. 1351–1359, XP 000168631, Warren Long et al. "Stationary Background Generation: An alternative to the difference of two images."

Proceedings of the Third International Workshop on Time–Varying Image Processing and Moving Object Recognition, 2: Florence, Italy, May 29–31, 1989; Elsevier, Amsterdam, NL, pp. 289–296, XP 000406130, Klaus–Peter Karmann et al., "Moving Object Recognition Using An Adaptive Background Memory".

Weng et al., "Complete Structure and Motion From Two Monoclular Sequences w/o Stereo Correspondence", Proc. 11th IAPR Int'l Conf. on Pattern Rec. vol. 1 Conf. A, pp. 651–654 (1992).

Weldon et al., "How Accurately, Can Direct Motion Vision Determine Depth", IEEE Conf. on Computer Vision, vol. XVI, pp. 613–618 (1991).

Xu, "Qualitative Depth From Monoscopic Cues", Int'l Conf. on Image Processing . . . (Conf. Publ. No. 354) pp. 437–440 (1992).

Barman et al, "Estimation of Velocity, Acceleration, and Disparity in Time Sequences". Proc. IEEE Workshop Visual Motion (Cat. #91TH 0390–5) (1991), pp. 44–51.

Leung et al., "Estimating 3D Vehicle Motion . . . From Monocular and Stereo Image Sequences", IEEE Workshop on Visual Motion (Cat #91TH0390–5) pp. 62–68 (1991).

"Qualitative Reasoning About Physical Systems: An Introduction", D.G. Bobrow, Arificial Intelligence 24, pp. 1–6, 1984.

"Diagnosing Multiple Faults", Kleer et al., Artificial Intelligence 32, pp. 97–129, 1987.

"Casuality In Device Behavior", Iwasaki et al., Artificial Intelligence 29, pp. 3–32, 1986.

"How Circuits Work", J. de Kleer, Artificial Intelligence 24, pp. 205–280, 1984.

(List continued on next page.)

Primary Examiner—Jose L. Couso
Assistant Examiner—Matthew C. Bella
Attorney, Agent, or Firm—Adel A. Ahmed

[57] ABSTRACT

A process for background information recovery in an image including an image of a moving object, comprises the steps of identifying regions of moving objects relative to the background; deriving a moving constellation containing moving objects in a minimum circumscribing polygon; deriving partial background images associated with respective positions of the moving constellation; and combining ones of the partial background images.

18 Claims, 8 Drawing Sheets

GET A SEQUENCE OF DIGITIZED IMAGES WITH A MOVING OBJECT (BLACK BALL IN THIS EXAMPLE)

OTHER PUBLICATIONS

"Dynamic Casual Model Construction For Model-Based Reasoning", Lee et al., Proceedings WESTEX-87, pp. 90-95, 1987.

"Extraction Of Motion Information From Peripheral Process", R. Jain, IEEE Trans. Pattern Anal. Machine Intell., vol. 3, No. 5, pp. 489-503, Sep. 1981.

"Survey Dynamic Scene Analysis", Martin et al., Comput. Graph. Image Processing, 7, pp. 356-374, 1978.

"Computer Tracking Of Objects In Space", Roach et al., IEEE Trans. Pattern Anal. Machine Intell., vol. 1, No. 2, pp. 127-135, Apr. 1979.

"Rigid Body Motion From Depth And Optical Flow", Ballard et al., Comput. Vision, Graph. Image Processing, 22, pp. 95-115, Apr. 1983.

"Towards Automatic Visual Obstacle Avoidance", H.P. Moraveck, in Proc. Fifth Int. Joint Conf. Artif. Intell., vol. 2, p. 584, 1977.

"Computational Experiments With A Feature Based Stereo Algorithm", W.E.L. Grimson, IEEE Trans. Pattern Anal. Machine Intell., vol. 7, No. 5, pp. 17-33, Jan. 1985.

"The Perception of Apparent Motion", Ramachandran et al., Scientific American, pp. 102-109, Jun., 1986.

"A Homogenous Framework For Visual Recognition", Kjeldsen et al., Proceedings, IJCAI, pp. 1578-1584, 1989.

"Determining Optical Flow", Horn et al., Artificial Intelligence 17, pp. 185-203, 1981.

"Image Understanding Environments", Lawton et al., IEEE Proc., vol. 76, No. 8, pp. 1036-1050, Aug. 1988.

"Hypothesis Integration In Image Understanding Systems", Hwang et al., Comput. Vision, Graph. Image Processing, 36, pp. 321-371, 1986.

"Symbolic Reasoning Among 3-D Models and 2-D Images", R.A. Brooks, Artificial Intelligence 17, 1982, pp. 285-348.

"Segmentation and Description Based on Perceptual Organization", Mohan et al., Proceedings, CVPR, pp.333-339, 1989.

"Theory of Edge Detection", Marr et al., Proc. R. Soc. Lond. 207, pp. 187-217, 1980.

"Reference Frames for Animate Vision", D.H. Ballard, Proceedings, IJCAI, pp. 1635-1641, 1989.

"Modal Control of an Attentive Vision System", Clark et al., Proceedings, ICCV, pp. 514-523, 1988.

"Eye Fixation and Early Vision: Kinetic Depth", D.H. Ballard, Proceedings, ICCV, pp. 524-531, 1988.

"A Fundamental Tradeoff in Knowledge Representation and Reasoning", R. Reiter, Readings in Knowledge Representation, Morgan Kaufmann Publishers, Inc., Los Altos, CA, pp. 42-70, 1985.

"The Motion Coherence Theory", Yuille et al., Proceedings, ICCV, pp. 344-353, 1988.

"A Short-Range Process in Apparent Motion", O. Braddick, Vision. Res., vol. 14, pp. 519-527, 1974.

"Computing Motion and Structure From Noisy, Time-Varying Image Velocity Information", J. Barron, Technical Report, RBCV-TR-88-24, Dept. of Comp. Scie., Univ. of Toronto, Toronto, Ontario, Canada.

"Temporal Edges: The Detection of Motion and the Computation of Optical Flow", Duncan et al., Proceedings, ICCV, pp. 374-382, 1988.

"Dynamic Stereo Vision", L. Matthies, Ph.D. Dissertation, Comput. Dept. Carnegie Mellon Univ. Pitts, PA, CMU-CS-89-195, Oct. 1989.

"Self Calibration of Motion and Stereo Vision for Mobile Robot Navigation", Brooks et al., MIT A.I. Memo 984, 1987.

"Generating an Interpretation Tree from a CAD Model for 3-D Object Recognition in Bin-Picking Tasks", K. Ikeuchi, Int. Journ. Comp. Vis., vol. 1, No. 2, pp. 145-165, 1987.

FIG. 6

BACKGROUND RECOVERY PROCESS FLOW

0) TAKE CONSECUTIVE FRAMES WHICH HAVE MOVING OBJECT
   (SQUARE BLOCK IN THIS EXAMPLE)

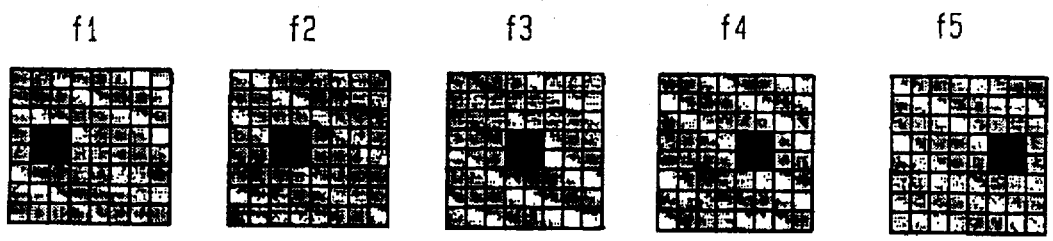

1) GET DIFFERENCE FRAME FROM TWO CONSECUTIVE FRAMES (fi-fi-1)

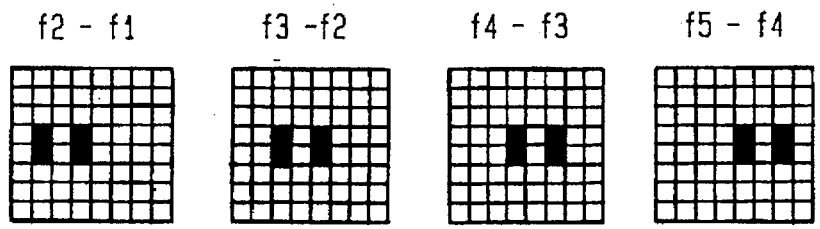

2) GET A BOUNDING BOX FRAME FROM EACH DIFFERENCE FRAME

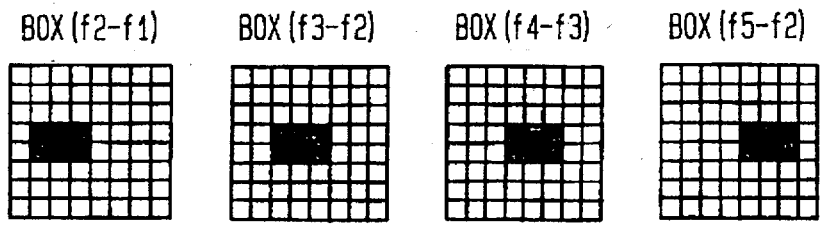

3) GET PARTIAL BACKGROUND FRAME FROM EACH BOUNDING BOX FRAME,
   i.e. REGIONS EXCEPT A BOUNDING BOX

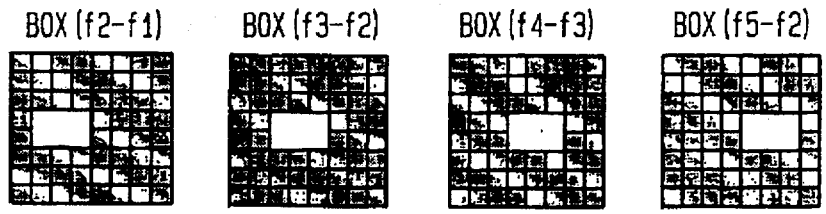

4) OVERLAP EACH PARTIAL BACKGROUND FRAME TO BACKGROUND FRAME TO BE RECOVERED

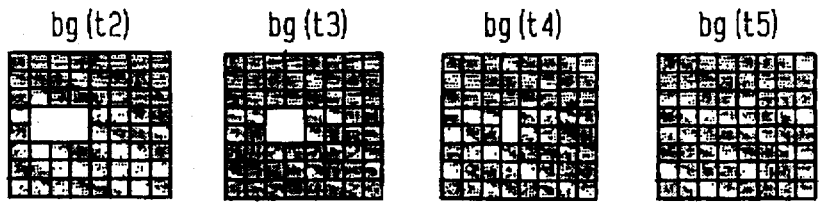

GET A SEQUENCE OF DIGITIZED IMAGES WITH A MOVING OBJECT
(BLACK BALL IN THIS EXAMPLE)

IDENTIFY A CONSTELLATION OF ONE REGION ASSOCIATED WITH THE
MOVING OBJECT IN EACH IMAGE

DERIVE PARTIAL BACKGROUND IMAGES ASSOCIATED WITH RESPECTIVE POSITIONS
OF MOVING CONSTELLATIONS

COMBINE PARTIAL BACKGROUND IMAGES TO CREATE A RECOVERED IMAGE

GET A SEQUENCE OF DIGITIZED IMAGES WITH A MOVING OBJECT
(BLACK BALL IN THIS EXAMPLE)

IDENTIFY A CONSTELLATION OF ONE REGION ASSOCIATED WITH THE
MOVING OBJECT IN EACH IMAGE

DERIVE PARTIAL BACKGROUND IMAGES ASSOCIATED WITH RESPECTIVE POSITIONS
OF MOVING CONSTELLATIONS

COMBINE PARTIAL BACKGROUND IMAGES TO CREATE A RECOVERED IMAGE

GET A SEQUENCE OF DIGITIZED IMAGES WITH A MOVING OBJECT (BLACK BALL IN THIS EXAMPLE)

IDENTIFY A CONSTELLATION OF ONE REGION ASSOCIATED WITH THE MOVING OBJECT IN EACH IMAGE

DERIVE PARTIAL BACKGROUND IMAGES ASSOCIATED WITH RESPECTIVE POSITIONS OF MOVING CONSTELLATIONS

COMBINE PARTIAL BACKGROUND IMAGES TO CREATE A RECOVERED IMAGE

BACKGROUND RECOVERY IN MONOCULAR VISION

CROSS REFERENCE TO RELATED APPLICATION

This is a continuation of Ser. No. 08/087,224 filed Jul. 2, 1993, now abandoned

BACKGROUND OF THE INVENTION

1. Field of the Invention

The present application relates generally to vision technology and more particularly to background recovery and motion estimation.

2. Description of the Prior Art

Motion estimation has been an important goal in vision technology for many years. See, for example, R. Jain, "Extraction of motion information from peripheral process," IEEE Trans. Pattern Anal. Machine Intell., vol. 3, No. 5, pp. 489–503, September 1981, mentioned above; W. N. Martin and J. K. Aggarwal, "Survey Dynamic scene analysis," Comput. Graph. Image Processing, 7, 356–374, 1978; J. Roach and J. K. Aggarwal, "Computer tracking of objects in space," IEEE Trans. Pattern Anal. Machine Intell., vol. 1, No. 2, pp. 127–135, April 1979; D. H. Ballard and O. A. Kimball, "Rigid body motion from depth and optical flow," Comput. Vision, Graph. Image Processing, 22, pp. 95–115, April 1983; H. P. Moraveck, "Towards automatic visual obstacle avoidance," in Proc. Fifth Int. Joint Conf. Artif. Intell., vol. 2, p. 584, 1977; W. E. L. Grimson, "Computational Experiments with a Feature Based Streo Algorithm," IEEE Trans. Pattern Anal. Machine Intell., vol. 7, No. 5, pp. 17–33, January 1985; D. Marr and T. Poggio, "A theory of human stereopsis," MIT AI Memo 451 AI Lab., Mass. Inst. Technol. Cambridge, Mass., 1977; V. S. Ramachandran and S. M. Anstis, "The perception of apparent motion," Scientific American, 102–109, June, 1986; R. K. Kjeldsen, R. M. Bolle, A. C. Califano and R. W. Taylor, "A Homogeneous Framework for Visual Recognition," Proceedings, IJCAI, 1578–1584, 1989.

A number of techniques have been developed to extract and represent object motion in short-range or long-range. However, most techniques can hardly be integrated in a homogeneous frame since the correspondence problem in motion estimation requires either intensive computation for a generalized approach, such as contour motion, as for example, E. Hildreth, the measurement of visual motion MIT Press, Cambridge Mass. 1984, or image flow in short-range motion; see for example, B. K. P. Horn and B. G. Schunk, "Determining optical flow," Artificial Intelligence 17, 185–203, 1981 or extra constraints for feature-based matching in long-range motion. See, for example, D. T. Lawton and C. C. McConnel, "Image Understanding Environments," IEEE Proc., vol. 76, No. 8. 1036–1050, August 1988.

Similar work has been done in many different places. Precision is the result of intensive computation in classical estimation techniques. See, e.g. J. Barron, "Computing motion and structure from noisy, time-varying image velocity information," Technical report, RBCV-TR-88-24, Dept. of Comp. Scie., Univ. of Toronto, Toronto, Ontario, Canada; J. H. Duncan and T. Chou, "Temporal edges: the detection of motion and the computation of optical flow," Proceedings, ICCV, 374–382, 1988 L. Matthies, "Dynamic stereo vision," Ph.D. Dissertation, Comput. Dept. Carnegie Mellon Univ., Pitts. Pa. CMU-CS-89-195, October 1989; A. Gelb, Applied optimal estimation, (11th ed.), The M.I.T. Press, Cambridge, Mass., 1989. Some extra problem specific constraints, such as known object models have been also used in trading off generality. See, e.g. K. Ikeuchi, "Generating an interpretation tree from a CAD model for 3-D object recognition in bin-picking tasks," Int. Journ. Comp. Vis. vol. 1, No. 2., 145–165, 1987 However, our qualitative reasoning approach is very promising. The motion estimation process is herein qualitatively analyzed and put in a framework to minimize quantitative computations.

SUMMARY OF THE INVENTION

In accordance with a first aspect of the invention, a process for background information recovery in an image including an image of a moving object, comprises the steps performed on the image of:

a) identifying regions of moving objects relative to the background;

b) deriving a moving constellation containing moving objects in a minimum circumscribing polygon;

c) deriving partial background images associated with respective positions of the moving constellation; and d) combining ones of the partial background images.

In accordance with a second aspect of the invention, the regions of a moving object are identified by deriving difference images between successive images including the moving object.

In accordance with a third aspect of the invention, the partial background images are derived by selecting regions outside of the circumscribing polygon.

In accordance with a fourth aspect of the invention, the circumscribing polygon is a rectangle.

In accordance with a fifth aspect of the invention, a depth of the moving object is obtained from the first derivative of size of the image of the moving object.

In accordance with a sixth aspect of the invention, a velocity of the moving object is obtained from a perspective compensated image of the object.

In accordance with a seventh aspect of the invention, information recovery is in accordance with the steps of:

(1) estimating depth, z, with the equation $$l/(z-kw_i)=l_if,$$

if $1/l_{i+1} \geq T$, the threshold value, being the number of pixels which a system requires as a minimum difference in pixels;

(2) deriving a rough depth estimation and z component velocity estimation using three consecutive frames or every second three frames;

(3) compensating perspective distortion for x, y in the image using $(u-x_p dz/dt, v-y_p dz/dt)$; and (4) determining x, y velocity components compared to the previous frame.

In accordance with an eighth aspect of the invention, the threshold value is dynamically selected after checking a line size change in previous frames.

In accordance with a ninth aspect of the invention, a process for background information recovery in an image including an image of a moving object, comprises the steps performed on the image of:

a) identifying regions of moving objects from the background;

b) deriving a moving constellation containing moving objects in a minimum circumscribing polygon;

c) deriving partial background images associated with respective positions of the moving constellation; and d) combining ones of the partial background images to derive the background to be recovered; and wherein a background image is recursively obtained and updated in accordance with the algorithm:

$$Mc_i = Rm\tau(I_i - I_{(i-1)})$$

$$Bg_0 = I_0$$

$$Bg_i = Bg_{(i-1)} \cup_r (I_i - Mc_i)$$

$$Bg_{unknown} = \cap_{sub\{i=0..n\}} Mc_i$$

where $I_i$ denotes input image and $Mc_i$ is a moving constellation at the ith frame.

In accordance with a tenth aspect of the invention, a process for background image recovery wherein frames are formed of an image, comprises the steps of:

a) Taking two consecutive frames into an image buffer storage continuously at a general video frame rate and always storing two consecutive frames;

b) Deriving an intensity difference frame from the two consecutive frames;

c) Binarizing the intensity difference frame to get a bounding box frame;

d) Forming a bounding box in a binarized frame using horizontal and vertical projections and thresholding both ends of the bounding box to get boundaries of the bounding box by utilizing a threshold value dependent upon the size of a moving object;

e) Deriving a partial background frame from a frame of the bounding box, wherein regions except for a region of the bounding box constitute a recovered static background; and f) overlapping each partial background frame to the background frame to be recovered, thereby incrementally recovering and updating the background every frame.

In accordance with an eleventh aspect of the invention, a process for background information recovery in an image including an image of a moving object, comprises the steps of:

a) storing consecutive frames including therein the image of a moving object;

b) deriving difference frames from consecutive ones of the frames;

c) deriving a bounding box frame from each difference frame;

d) deriving a partial background frame from each bounding box frame wherein the partial background frame excludes an area within a bounding box; and e) overlapping the partial background frames for providing the background information to be recovered.

BRIEF DESCRIPTION OF THE DRAWINGS

The invention will be further understood from the detailed description of preferred embodiments which follows, in conjunction with the drawing, in which

FIG. 6 shows in simplified diagrammatic form an overview of certain steps in accordance with the invention;

DETAILED DESCRIPTION OF THE PREFERRED EMBODIMENTS

Figure 1:
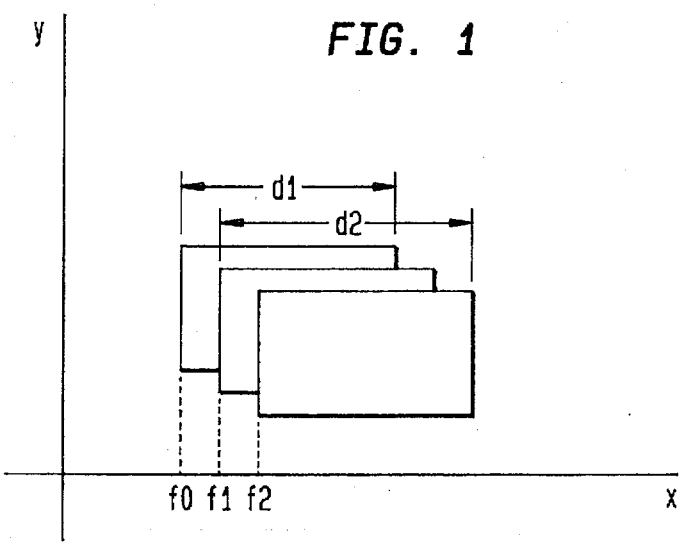
FIG. 1 shows the velocity from difference images. d1=f1−f0, d2=f2−f1.

Motion estimation is an important attribute for robot vision. A qualitative reasoning approach for monocular motion estimation is presented here. Its principal advantage is to minimize quantitative computation. Qualitative reasoning about physical systems has shown that physical behavior in quantitative space can be analyzed and described in qualitative terms. See, e.g. D. G. Bobrow, "Qualitative reasoning about physical systems: An introduction," Artificial Intelligence 24, 1–6, 1984. An input primitive, for example in computer graphics, is a basic data item from an input device such as a keyboard, locator device, or a valuator device. The primitives in qualitative reasoning are defined as primitives which connect system behavior and structural components. Though the primitives in vision processing are not well defined as in tangible physical systems, qualitative reasoning principles can still be applied to vision tasks with a properly defined set of primitives.

The method in accordance with the present invention is in a general sense analogous to human motion perception processes.

Human motion perception, such as peripheral, attentive and cognitive processes is qualitatively emulated with a fovea locking and a spatio-temporal reasoning. See, e.g. R. Jain, "Extraction of motion information from peripheral process," IEEE Trans. Pattern Anal. Machine Intell., vol. 1, No. 5, pp. 489–503, September 1981.

The fovea locking based on a dynamic background recovery identifies multiple moving objects in real time. The spatio-temporal reasoning based on object motion history minimizes quantitative computation. In accordance with a preferred embodiment of the present invention, stationary background and moving objects in the image are used as motion perception primitives. Experimental results with an exemplary embodiment of the present invention are presented with regard to moving cars on a busy street.

First, as in peripheral processes, regions of moving objects are identified from the background. The background is recovered in real time by a moving constellation, which contains moving objects in a minimum rectangle. This provides an "area of interest", that is, a fovea locking on moving objects and thus simplifies the rest of the motion estimation process. In attentive and cognitive processes, motion estimation is obtained by qualitatively analyzing the moving edges. The depth is estimated from the first derivative of object size in the image and the velocity is obtained from the perspective compensated image of the object.

During the estimation process, a spatio-temporal reasoning which analyzes constellation history is carried out to ensure the validity of each step of motion estimation. This approach minimizes quantitative computation with automatic focus of attention.

First, qualitative reasoning and the related vision research will be briefly explained. Then, moving edge characteristics and background recovery as motion perception primitives will be explained, followed by an explanation of reasoning with constellation. Thereafter, system implementation is described and some experimental results of moving cars are presented and compared with prior art approaches. The possible technical limits of the present method are also discussed.

Qualitative reasoning, per se, has been studied in many different domains. See for example, D. G. Bobrow, "Qualitative reasoning about physical systems: An introduction, "Artificial Intelligence 24, 1–6, 1984; J. de Kleer and B. Williams, "Diagnosing Multiple Faults," Artificial Intelligence 32, 97–129, 1987; Y. Iwasaki and H. Simon, "Causality in device behavior," Artificial Intelligence 29, 3–32, 1986; J. de Kleer, "How circuits work," Artificial Intelligence 24, 205–280, 1984; C. N. Lee, P. Liu and M. Chiu, "Dynamic causal model construction for model-based reasoning,"Proceedings WESTEX-87, 90–95, 1987. Generally, phenomena in quantitative space are abstracted and described using qualitative terms, that is, a carefully selected set of discrete symbols. In physical systems the system's functional structure and its physical realization are described with a set of primitives. The primitives are then used to explain system behavior and structure. For example, electrical device primitives, such as resistor, capacitor and transistor can be used to describe how a common emitter feedback amplifier works.

The primitives describing system behavior can be chosen by causal analysis and teleological analysis of a system. See, for example, the aforementioned C. N. Lee, P. Liu and M. Chiu, "Dynamic causal model construction for model-based reasoning," Proceedings WESTEX-87, 90–95, 1987. Causal analysis describes the relations of functional components. Teleological analysis describes the design purpose of the system. Such analyses require a deep understanding of underlying mechanism in the system. For motion perception, causal analysis can be performed on an image, such as perspective projection, stationary background and moving objects in the image. The teleological analysis is related to an attentive control in active vision. See, for example, D. H. Ballard, "Reference Frames for Animate Vision," Proceedings, IJCAI, 1635–1641, 1989; J. J. Clark and N. J. Ferrier "Modal control of an attentive vision system," Proceedings, ICCV, 514–523, 1988; D. H. Ballard, "Eye fixation and early vision: Kinetic depth," Proceedings, ICCV, 524–531, 1988. Once a vision task is given, appropriate vision processes can be selected by analyzing the given task.

In vision research, qualitative reasoning has been performed in many different forms, such as knowledge-based image understanding, see for example D. T. Lawton and C. C. McConnel, "Image Understanding Environments," IEEE Proc., vol. 76, No. 8. 1036–1050, August 1988; V. S. Hwang, L. S. Davis, and T. Matsyama, "Hypothesis Integration in Image Understanding Systems," Comput. Vision, Graph. Image Processing, 36, 321–371, 1986; R. A. Brooks, "Symbolic Reasoning Among 3-D Models and 2-D Images," Artificial Intelligence 17, 1982, 285–348 perceptual organization; see for example, R. Mohan and R. Nevita "Segmentation and Description Based on Perceptual Organization", Proceedings, CVPR, 333–339, 1989; D. Marr and E. Hildreth, "Theory of edge detection," Proc. R. Soc. Lond. 207, 187–217, 1980; D. H. Ballard, "Reference Frames for Animate Vision," Proceedings, IJCAI, 1635–1641, 1989, underlying biological mechanism, see for example, D. H. Ballard, "Reference Frames for Animate Vision," Proceedings, IJCAI, 1635–1641, 1989, J. J. Clark and N. J. Ferrier "Modal control of an attentive vision system," Proceedings, ICCV, 514–523, 1988; D. H. Ballard, "Eye fixation and early vision: Kinetic depth,"Proceedings, ICCV, 524–531, 1988 and so forth. The ontological primitives vary depending upon the tasks. See, for example, J. de Kleer, "How circuits work," Artificial Intelligence 24, 205–280, 1984.

In knowledge-based image understanding, image operators are used as primitives and the operator control has been studied with various reasoning strategies and representations. The reasoning mechanism decides image operators and their application sequence. The system representation decides the reasoning boundary. The fundamental tradeoff between representation and reasoning is well known. See, for example, R. Reiter, "A Fundamental Tradeoff in Knowledge Representation and Reasoning", Readings in Knowledge Representation, Morgan Kaufmann Publishers, Inc. Los Altos, Calif. 42–70, 1985. For perceptual understanding, perceptual primitives such as edges, curves, and regions have been studied, emphasizing computational and psychophysical aspects since visual perception is carried out through those primitives. The motion coherence theory explains those primitives' dynamic characteristics with an image velocity field. See, for example, A. L. Yuille and N. M. Grzywacz, "The motion coherence theory," Proceedings, ICCV, 344–353, 1988. For underlying the biological mechanism, focus of visual attention has been studied with fovea locking or gaze control in active vision. See, for example, D. H. Ballard, "Eye fixation and early vision: Kinetic depth," Proceedings, ICCV, 524–531, 1988.

The area of interest can be used as an abstract primitive which provides motion information, even though there is little logical reasoning process involved. It has been shown that visual perception process is greatly simplified with fovea locking on a target object. See, for example, D. H. Ballard, "Reference Frames for Animate Vision," Proceedings, IJCAI, 1635–1641, 1989.

Some qualitative primitives are apparent in vision tasks. Though the ontological primitives in vision process are not as well defined as in physical systems, it is herein recognized that the same principles of qualitative reasoning can still be applied in vision tasks. The necessary primitives can be properly defined by analyzing a given task. In the present exemplary embodiment, background and objects in the image are used as motion perception primitives. The motion estimation is obtained by analyzing the perspective projection and the relations between background and objects in the image. Qualitatively moving edge characteristics and background recovery will next be analyzed.

The objects move in time and space and their discrete pixel data is available for motion estimation. Apparent motion of an object is perceived by a global activity such as boundary change or a local activity such as pixel intensity change. See, for example, V. S. Ramachandran and S. M. Anstis, "The perception of apparent motion," Scientific American, 102–109, June, 1986, and O. Braddick, "A short-range process in apparent motion," Vision Res. vol. 14, 519–527, 1974. While image intensity alone is herein considered in reference to the present exemplary embodiment, it is herein recognized that an experiment of a sign grating image with an incoherent random dot pattern indicates that movement can be also perceived as a group activity without clear edges, that is, texture. Boundary change can be calculated in two different ways: by optical flow in pixel level and moving edge in region level. The optical flow approach is known See, for example, D. H. Ballard and O. A. Kimball, "Rigid body motion from depth and optical flow," Comput. Vision, Graph. Image Processing, 22, pp. 95–115, April 1983, B. K. P. Horn and B. G. Schunk, "Determining optical flow," Artificial Intelligence 17, 185–203, 1981, J. Barron, "Computing motion and structure from noisy, time-varying image velocity information,"Technical report, RBCV-TR-88-24, Dept. of Comp. Scie., Univ. of Toronto, Toronto, Ontario, Canada; J. H. Duncan and T. Chou, "Temporal edges: the detection of motion and the computation of optical flow," Proceedings, CVPR, 374–382, 1989; L. Matthies, "Dynamic stereo vision," Ph.D. Dissertation, Comput. Dept. Carnegie Mellon Univ., Pitts. PA. CMU-CS-89-195, October 1989. An intuitive and elegant mathematical discussion of temporal edge and spatial edge is known in connection with the application of optical flow to computation of normal velocity of an object boundary. See, for example, J. H. Duncan and T. Chou, "Temporal edges: the detection of motion and the computation of optical flow," Proceedings, CVPR, 374–382, 1989. This method is appropriate for pixel level computation.

However, if object movement is more than one or two pixels, then Gestalt perception, such as shape recognition, is used. It is known that our preexisting knowledge resolves motion ambiguity, which occurs in visual perception of discrete image frames. See, for example, O. Braddick, "A short-range process in apparent motion," Vision Res. vol. 14, 519–527, 1974. It is herein recognized that, therefore, object motion can be easily estimated if knowledge about moving edges and the background is available. Next, moving edge characteristics and related motion estimation, and background recovery for clear edge detection are discussed.

Object motion can be estimated from the corresponding moving edges. A moving edge is a spatio-temporal primitive in pixel level and region level. The moving edge and the corresponding object motion can be obtained from difference images. Consider three consecutive frames in FIG. 1. If the object moves with a constant velocity v, then the velocity can be approximated by the distance between two boundaries of difference images. This method works only when an object moves in an xy plane, i.e, no depth change, ($\Delta z=0$).

Figure 2:
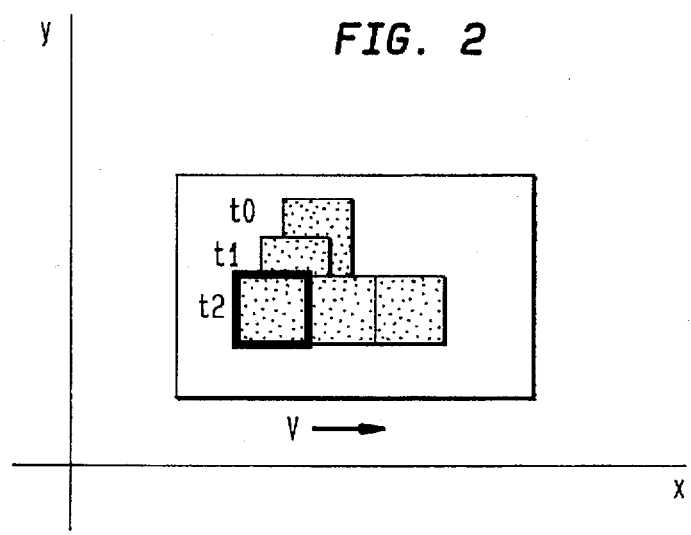
FIG. 2 shows the spatio-temporal relation of image pixels. The bold square is the observing window when a three square object is moving to the right on xy image plane.

The depth can be estimated from the first derivative of object size in the image or from the intensity history of each pixel. The depth change of an object appears in the xy image plane as a change of perspective projection. This perspective projection change at the region level is used for depth estimation. At the pixel level, equivalent information can be obtained. FIG. 2 shows how the intensity history of a pixel is related to spatial change. If $\Delta z=0$, then the intensity history of a pixel represents the object image intensities (or linearly interpolated image) which passed through the pixel location. It reflects the path of object movement on an xy image plane. If $\Delta z=0$, then the intensity history of a pixel represents a series of consolidated pixels (receding object) or expanded pixels (approaching object) due to perspective projection.

To observe this more clearly, consider a moving object in world coordinates (x, y, z), with instantaneous velocity (dx/dt, dy/dt, dz/dt)=(u, v, w) at $(x_0,y_0,z_0)$. Assume a camera focal length f=1 and consider perspective projection at the image plane $(x_p, y_p)=(x/z, y/z)$, then, after a time interval t, its image will be at $(x_{p1}, y_{p1})=((x_0+ut)/(z_0+wt), (y_0+vt)/(z_0+wt))$. Thus, a fixed point in the image $(x_{pc}, y_{pc})$, will reflect dz/dt of the moving object at $(x_c, y_c)$ in space if u=v=0. If dz/dt is constant and u=v=0, then the intensity history represents object surface intensity sampled with equal distance. In other words, the intensity history can be recovered from an image by taking a 1/z scaled sampling.

This can also be explained using a convective conservation equation. With the relation between 3-D motion and continuous intensity assumption, the following equation results $$I(x + dx, y + dy, z + dz, t + dt) = I(x,y,z,t) + \frac{\partial I}{\partial x} dx + \frac{\partial I}{\partial y} dy + \frac{\partial I}{\partial z} dz + \frac{\partial I}{\partial t} t + HT \text{ (higher order terms)}$$

If the first derivatives only are considered and higher-order terms (HT) are neglected, the following equation results as a 3-D optical flow equation:

$$\frac{\partial I}{\partial x} u + \frac{\partial I}{\partial y} v + \frac{\partial I}{\partial z} w + \frac{\partial I}{\partial t} = 0$$

The term $\partial I/\partial z$ is merged into the first two terms if a perspective projection is taken onto an image plane. If there is no depth change, i.e. w=0, then it becomes a general optical flow equation. The $dx_p$ and $dy_p$ in the image correspond to dx and dy scaled by a constant value z. However, if w=0, then $dx_p$ and $dy_p$ become $(dx+x_p dz/z)/z$ and $(dy+y_p dz/z)/z$, which are obtained by first order simplification of $1/(z-dz)$. Then the equation (3.1b) for perspective projection becomes $$\frac{\partial I}{\partial x} (u - x_p w/z) + \frac{\partial I}{\partial y} (v - y_p w/z) + \frac{\partial I}{\partial t} = 0$$

This relation implies that w/z needs to be considered for 3-D motion estimation, especially when $x_p$, $y_p$ and |w/z| are not small enough compared to |u| or |v|. This notion is herein applied for motion estimation, i.e., get w/z first and compensate $u-x_p w/z$ and $v-y_p w/z$ for moving objects in the image. In summary, the intensity history of moving object in the image contains z direction motion information as well as x and y direction information, i.e. a moving edge in space can be observed in the intensity history of pixels and gives motion estimation.

Now, the following formula of consecutive image frames of a moving object gives depth, z, and z component velocity, dz/dt, estimations.

$$l/(z - kw_i) = 1/f \quad (3.2a)$$

$$\sqrt{s} \; l/(z - kw_i) = \sqrt{si} \cdot lf$$

In equation (3.1a) l is physical object length, z is the distance between camera focal point and the object, k =(i mod 3) for three consecutive equations, $w_{i=dz/dt, t_i}$ is line image length at time $t_i$, and f is camera focal length. Equation (3.2b) is for object area s, rather than length l. Note that the above equation can be used with any three or more consecutive frames assuming $w_i$ is constant in those frame periods. If we assume an unknown focal length, four frame equations will give all the necessary information, i.e. depth, velocity, object size and focal distance. Once the object length l or object size s is known, two equations will be sufficient to estimate the velocity and depth.

In accordance with the present invention, a depth and z component velocity estimation algorithm is as follows:

(1) estimate depth z with equation (3.2), if $1/l_{i+1} \geq T$ threshold value, then use three consecutive frames or every second three frames for rough depth estimation and z component velocity estimation;

(2) compensate perspective distortion for x, y in the image using $(u-x_p dz/dt, v-y_p dz/dt)$, and (3) find out x, y velocity components compared to the previous frame.

The threshold value, T, is the number of pixels which the system requires as a minimum difference in pixels. The threshold value is dynamically decided after checking line size change in previous frames. If $T \approx 1$, then subpixel precision should be obtained by frame interpolation.

Motion and depth estimation in 3-D using consecutive difference images have been discussed. However, the discussion has been based on an assumption that the size of the image difference is not much greater than the object size in the image. This method works if an object velocity per frame is smaller than half the size of an object since the perspective compensation in algorithm 1 is based on the object size in the image. Also, it is not a reasonable constraint in most cases. To solve this problem, we need to know the exact object boundary in each frame.

In the following, an algorithm is presented for background recovery of moving objects. It is essential to estimate the object boundary precisely. In the approach in accordance with the invention, no time-consuming estimation process is involved and, furthermore, the background is continuously updated in real time.

Consider the single moving object case first. The first step to the background recovery of a moving object is building a moving constellation. A moving constellation is a minimum rectangle which contains thresholded difference in each frame. It always tracks a moving object and changes its size. Background is recovered by recursively replacing the first image with the current image, except in the region of the moving constellation.

Let $Bg_i$ denote recovered background image in ith frame time and $Bg_{unknown}$ denote unknown background area until ith frame time. The following three operators are defined for clarity of the following background recovery algorithm.

Definition 1: $\cup_r$ is a replace union operator. It replaces the elements in the first operand with the elements in a second operand set if and only if the location indexes (x, y) are the same.

Definition 2: "−" is a set difference operation in which each element has a location index (x, y).

Definition 3: "Rmτ" is a minimum rectangle operator. The minimum rectangle contains all elements of the operand set, of which value is greater than threshold value τ.

The background image is recursively obtained and updated as follows.
Algorithm 2:

$Mc_i \leftarrow Rm\tau(I_i - I_{i-1})$ $Bg_0 = I_0$ $Bg_i \leftarrow Bg_{i-1} \cup_r (I_i - Mc_i)$ $Bg_{unknown} = \cap_{sub[i=0..n]} Mc_i$ where $I_i$ denotes input image and $Mc_i$ is the moving constellation at the ith frame. Note that operations involved are basically pixel replace operations which can be executed very fast in any computer architecture. With this algorithm, a slowly changing background can be updated every frame and the object boundary can be recovered instantaneously by a difference operation.

Figure 3:
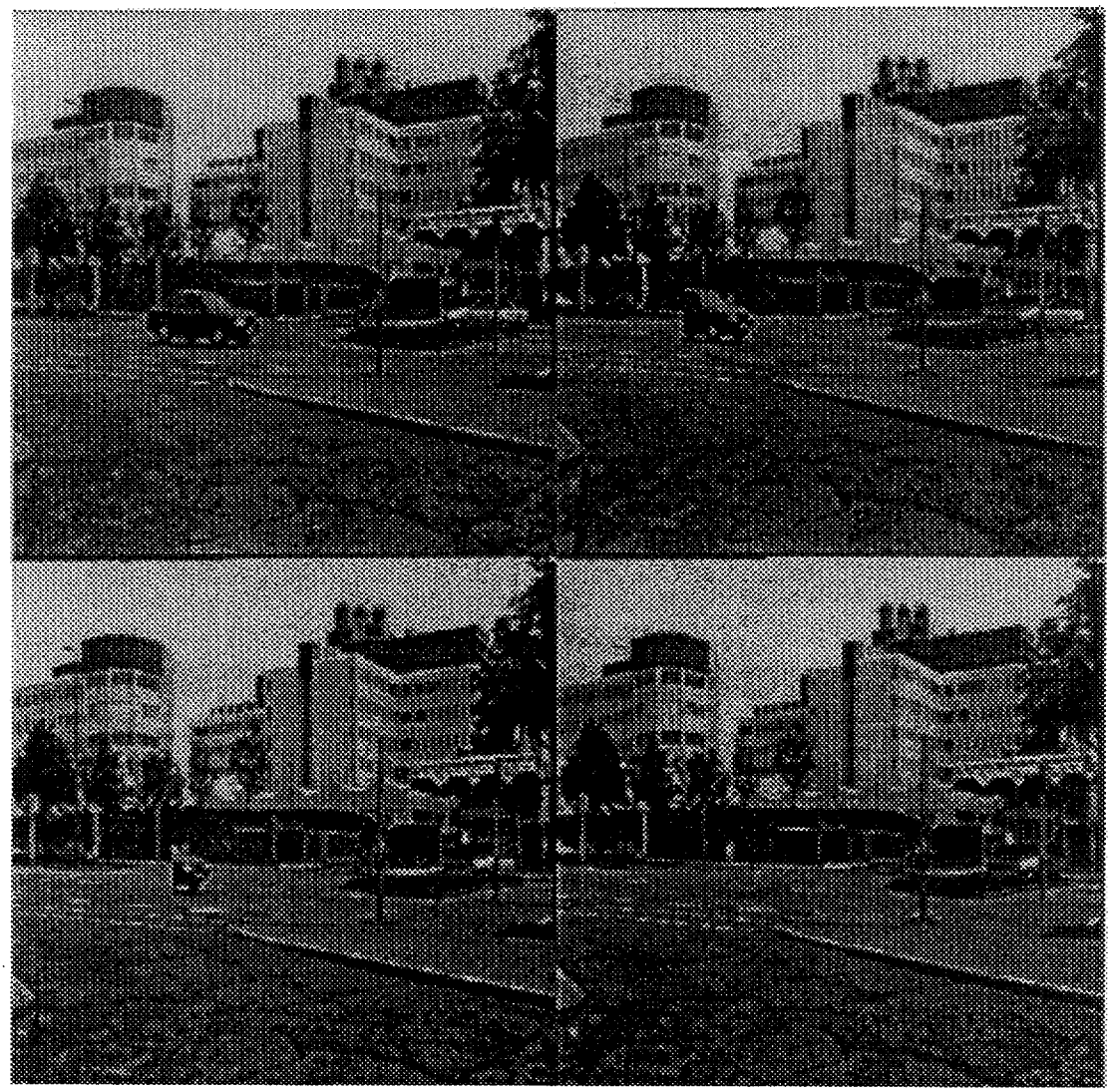
FIG. 3 shows input images and incrementally recovered background images.

For the multiple moving object case, we need to split the constellation using motion detection heuristics, such as length/width ratio, minimum object size in image, and constellation history. Only the general heuristics are used for the split process in accordance with the invention. FIG. 3 shows an example of the background recovery process.

There are two problems with this algorithm: 1) there is no guarantee of complete background recovery, and 2) in some cases of multiple moving objects, the constellation should be split for each object. No complete solution for 1) was obtained. For example, in rotational motion, the object does not move away from the original position. However, we know at least whether the background is recovered completely or not by the set intersect operation on $Mc_i$'s. If the intersection of moving constellations is an empty set, $\cap_{i=0..n} Mc_i = \phi$, then background is completely recovered. The partially recovered background is still useful for boundary detection. The area of unknown background is the area where the moving objects are. For problem 2), especially when multiple objects all move in different directions, window split needs more motion heuristics. For example, firework, it should be defined whether it is regarded as one constellation or not. However, the present inventors did not have such a case in their experiments, discussed below.

Figure 4:
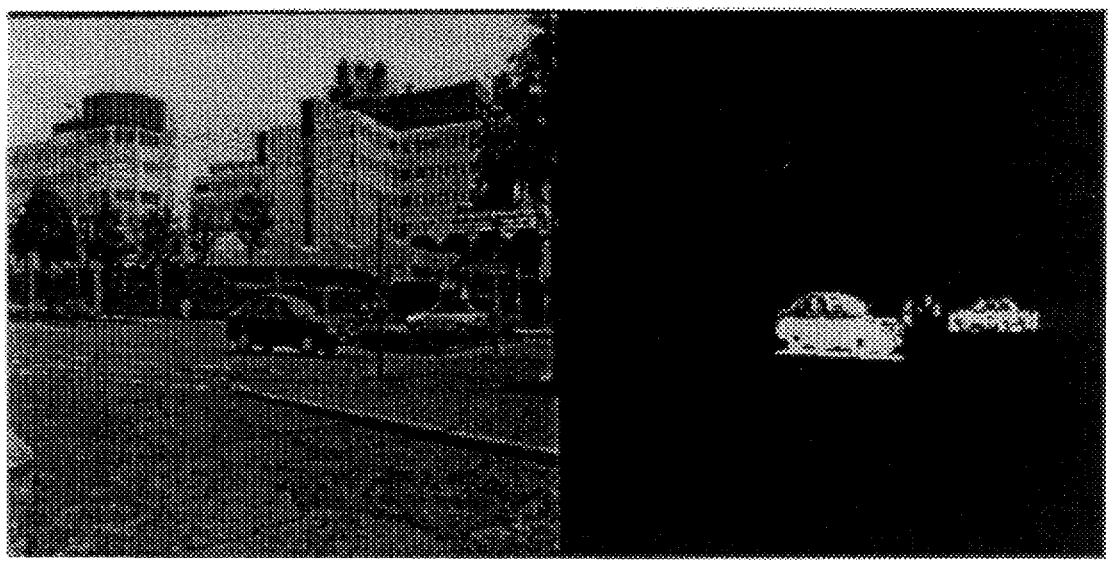
FIG. 4 shows object masks and their corresponding objects.
Figure 7A:
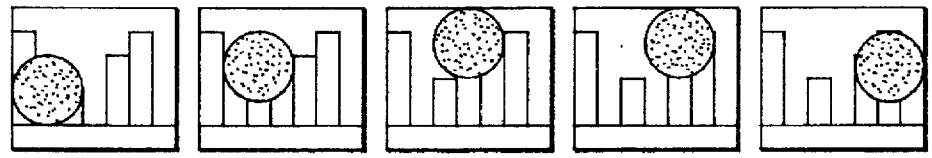
FIG. 7 shows the recovery of background by the series of steps in accordance with the invention.
Figure 7B:
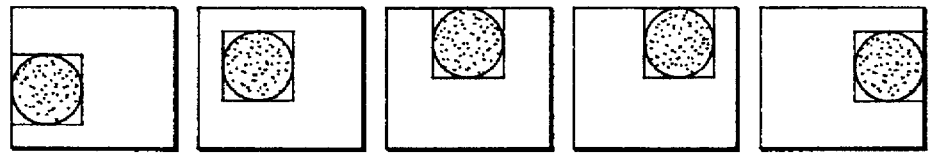
Figure 7C:
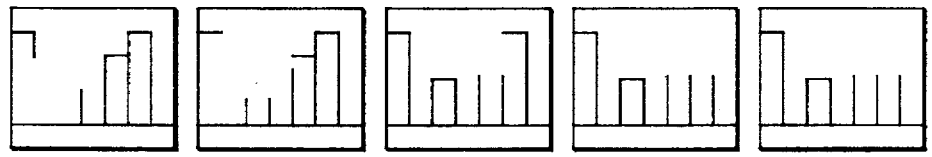
Figure 7D:
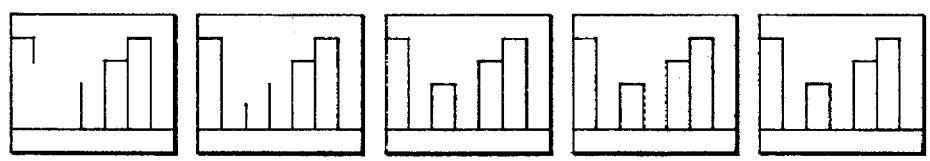

After the background is identified, the object mask is generated from a difference image between the current input image and the background image. It is similar to detecting moving objects by detecting background change in human motion perception. FIG. 4 shows the object masks and their corresponding objects. Once each object image is recovered using a corresponding object mask, further image processing, such as object recognition, can be performed on an individual object.

For object mask generation, we use a morphological closing operation. The structuring element for the closing operation can be dynamically configured for each object. The constellation description, such as size, centroid and density, provides a rough estimation of object size and its necessary structuring element size. We use constellation density, Dc, in $E_{size} = Mc_x * Mc_y * Dc/\{N*p\}$ where $E_{size}, Mc_x, Mc_y$, N, and p denote constellation size x, y, the number of objects (default is one), and noise factor p (default is 70) in the present system.

FIG. 6 provides a helpful diagrammatic summary of a basic background recovery process flow in accordance with the present invention.

Figure 5:
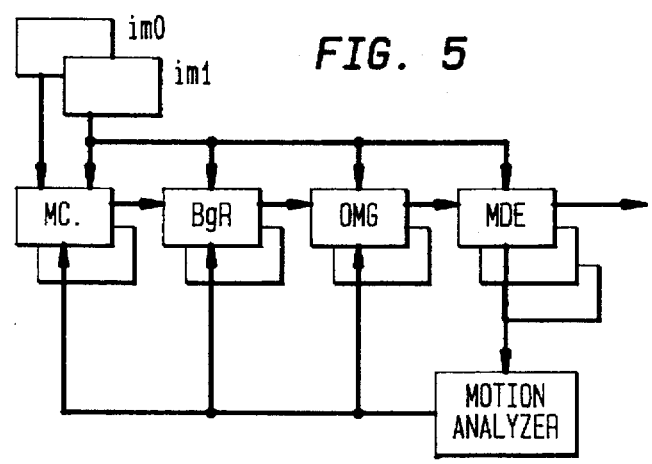
FIG. 5 shows control flow in reasoning with history.

Reasoning with history is not new. Most estimation techniques use history in one way or another. The present goal of reasoning is to make fast and reliable estimation based on current data and the previous estimation history. There follows a discussion of the spatio-temporal reasoning in each stage of estimation to show how it works. FIG. 5. shows the control flow in our spatio-temporal reasoning.

McG, BgR, OMG, MDE denote moving constellation generator, background recovery, object mask generator, and motion and depth estimator. In each module, its previous output and the MDE's previous output are used to assure a correct output. If the output is not believed, then it is adjusted using its previous output and MDE's. In the present system, except for the object mask generator module, only one previous output is kept for this purpose.

The estimation process starts with roughly identifying the region of moving objects and recovering background in parallel. The moving object area is located by a moving constellation. The constellation history is used to check object motion consistency. The object moves with approximately constant speed and the object image changes continuously. Thus, any unreasonable change such as a sudden enlargement or shrinking is discarded and replaced with the previous constellation. The changing ratio of constellation size and displacement is used to put limits on object size and velocity under motion estimation. By way of example, the cluttering effect due to tree leaves has been removed by this operation in the street scene experiments. This is a peak noise reduction operation.

The boundaries of moving objects are detected to form a set of moving objects and their corresponding object masks. During object mask generation, the constellation size and weight are used to dynamically configure the structuring element size for morphological a closing operation. Since the spatial change of background intensity is almost random, the previous size of structuring element can not be utilized. An object mask moving in the same constellation is assumed to be shape invariant. The semi-transparent window of a moving car is an example. This is a size-dependent very low frequency spatial filter operation.

After getting moving object masks, each object is labeled. During labeling, the history of each mask ensures that it matches the same object. Once the object masks are identified, the cases of temporarily overlapping or occluding are handled with their motion history. The present exemplary embodiment can handle only the partially overlapped case since just three frames of mask history are remembered and interpreted. The case of moving cars crossing or masking other cars is an example. However, motion estimation of an invisible object requires more frames to be analyzed in image understanding level.

After getting each object mask, the mask size is used for depth estimation. Since the exact boundary of each moving object and its movement history are known, the salient features of an object can actually be selected very fast. In the present exemplary embodiment, just a zero crossing on an averaged scan line at the object mask centroid is used. The precision of image size is also adjusted by looking at the previous motion and depth estimation, since, when an object moves very fast in the xy direction, the slow z movement has no practical importance in total motion estimation.

With this coarse depth estimation, a more precise motion and depth estimation process starts. Perspective compensation is performed for each object in the image and the object velocity is then estimated. The depth and object velocity are then smoothed using moving window average. No weighting curve has been used in the present exemplary embodiment. The final estimation result is reported to each stage to be used for prediction and to check performance in each estimation stage.

In a review of the method, FIG. 7 shows the recovery of background by the series of steps illustrated. Thus, FIG. 7 shows the derivation of a sequence of digitized images with a moving object, shown here as a black ball, for simplicity. FIG. 7(b) shows the identification of a constellation of one region associated with the moving object in each image. FIG. 7(c) shows the derivation of partial background images associated with respective positions of moving constellations. FIG. 7(d) shows the combining of partial background images to create a recovered image.

Thus, in accordance with FIG. 7, steps in accordance with the invention include 1) recovering the background using the steps shown above in FIG. 7; 2) identifying the area of moving object (polygon shape constellation) taking out the background; 3) calculating the first derivative of the size of the moving constellation to get the relative depth (z component in the xyz coordinate system) of a moving object; 4) using the z component known from the step 3) above. Thereafter, the steps include: (a) doing the perspective compensation for the xy coordinate of moving object in each image; (b) determining the x,y velocity components; (c) calculating the velocity of the moving object combining x, y and z components: and (d) calculating the threshold value using the minimum object size or line size calculated back to the input image.

Figure 8A:
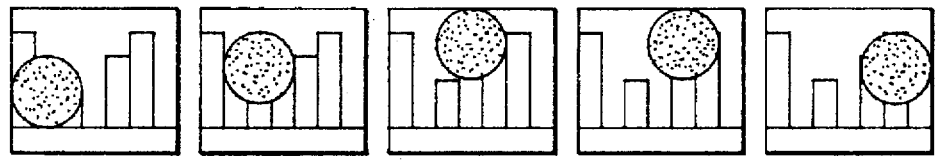
FIG. 8 shows the steps for an algorithm in accordance with the invention.
Figure 8B:
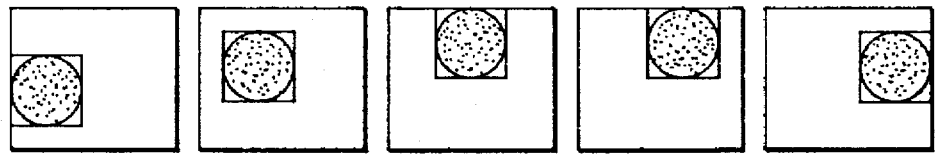
Figure 8C:
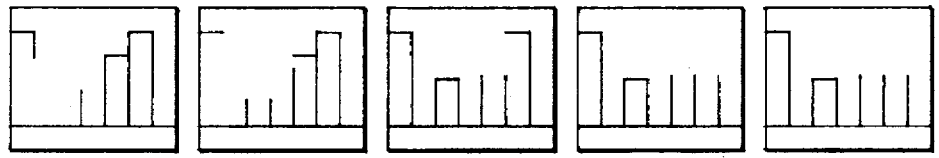
Figure 8D:

FIG. 8(a) shows the obtaining of digitized images with a moving object, such as a black ball. FIG. 8(b) shows the identification of a constellation of one region associated with the moving object in each image. FIG. 8(c) shows the derivation of partial background images associated with respective positions of moving constellations. FIG. 8(d) shows the combining of partial background images to create a recovered image.

Briefly, FIG. 8 illustrates the background recovery algorithm: 1) numbering the sequences of images; 2) detecting the moving object area circumscribing the difference image of two consecutive images in a polygon shape; 3) getting the partial background image taking out the moving object area from the respective images; and 4) overlaying the partial background images in one image (storage) to incrementally recover the full background image.

Figure 9A:
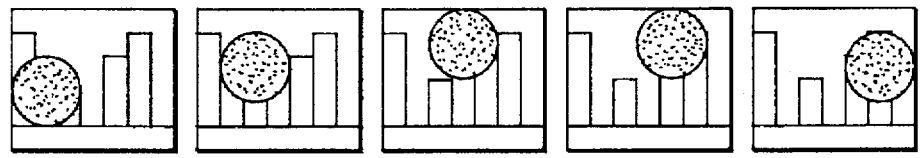
FIG. 9 shows the obtaining of digitized images with a moving object, such as a black ball in the present exemplary embodiment.
Figure 9B:
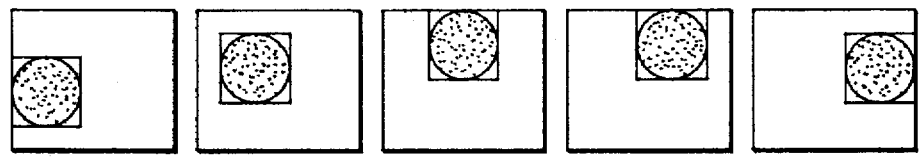
Figure 9C:
Figure 9D:

FIG. 9(a) shows the obtaining of digitized images with a moving object, such as a black ball in the present exemplary embodiment. FIG. 9(b) shows the identification of a constellation of one region associated with the moving object in each image. FIG. 9(c) shows the derivation of partial background images associated with respective positions of moving constellations. FIG. 9(d) shows the combining of partial background images to create a recovered image.

With regard to FIG. 9, an optical device can be used if a binarized image can be obtained with it. Briefly, the illustrated steps comprise: 1) storing the sequence of images in image buffer; 2) calculating the intensity difference image; 3) binarizing the difference image; 4) forming a bounding box to identify the changing part of input image; 5) calculating the background taking out the bounding box from an input image; 6) overlapping each partial background to the background frame to incrementally recover the full background; and 7) updating the background images.

Figure 10A:
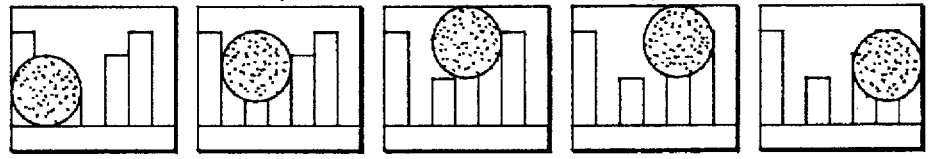
FIG. 10 shows the background recovery process at a general video frame rate.
Figure 10B:
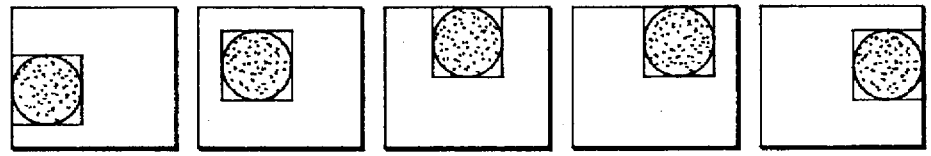
Figure 10C:
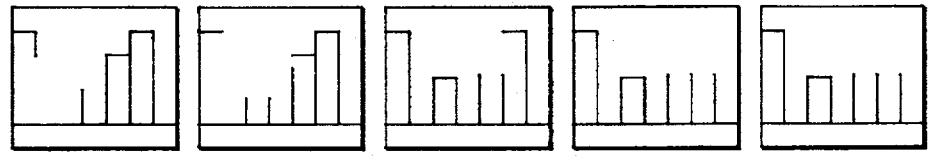
Figure 10D:
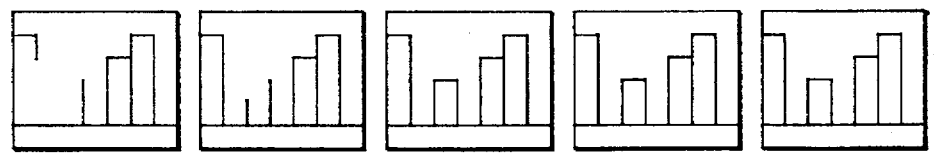

FIG. 10(a) shows obtaining a sequence of digitized images with a moving object, such as a black ball in the present example. FIG. 10(b) shows the identification of a constellation of one region associated with the moving object in each image. FIG. 10(c) shows the derivation of partial background images associated with respective positions of moving constellations. FIG. 10(d) shows the combining of partial background images to create a recovered image. Thus, the steps include 1) storing the sequence of images in image buffer; 2) calculating the intensity difference image; 3) binarize the difference image; 4) forming a bounding box to identify the changing part of input image; 5) calculating the background taking out the bounding box from an input image; and 6) overlapping each partial background to the background frame to incrementally recover the full background.

It has been disclosed how history is utilized in every stage of motion estimation. It is neither a simple hierarchical control nor a simple recursive control. Each module is adjusted continuously, using its own history and others. This may well be a reason as to why generalizing a technique in a vision is difficult. However, the moving constellation and history provide appropriate cues at each processing stage for a generalization of the present spatio-temporal reasoning.

The system has been implemented in the present exemplary embodiment on a workstation with commercially available vision hardware and software. A SUN™ 4/110 with ANDROX™ board and KBV™ software were used for low level vision processing and high level reasoning. The inventors have designed their own reasoning module using KBV environment and have tested their framework with two different setups, the 230 frames (256×288) of real street scenes and the 12 frames (256×256) of lab setups. They have used a video camera for our lab setup. A toy car three feet away from camera has been used and its velocity and location has been estimated in real time. The camera was calibrated and the optical center point and camera focal length were used.

In the moving cars on a street setup, ten cases were tested starting from image sequence number 0, 25, 50, 75, 100, 125, 150, 175 and 200. In all cases the background has been completely recovered after seven frames on an average. There has been no drastic change in motion pattern of the moving cars. The threshold value T adjusted by the system is less then 2 pixels since cars have moved at least more than four pixels per frame time in this experiment. Normalized focal length was used to represent object location, size and velocity. Consistent velocity and depth estimation of maximum three moving cars have been obtained successfully even when they are overlapping each other.

In a lab setup, applicants have achieved very precise estimation of depth and velocity of a toy car in an exemplary embodiment. The error is less than 8 percent both in depth and velocity. The error has been caused by the object size change in the image due to car shadow and due to apparent shape change caused by rotation. The system generates a warning message when the viewing direction of the car is changing more than half of the camera viewing angle. Also, the system has ruled out the case of no change in the z direction in five consecutive frames. Knowledge of motion patterns of moving objects can be utilized for more precise estimation. The setup has been used for obtaining normalized velocity estimation only. It is worth mentioning that a goal of motion estimation is to get a qualitative estimation with reasonable precision in real time, rather than with a high precision but not in real time.

Motion and depth estimation have been obtained in real time. The system can handle multiple moving objects and some overlapping cases, too. No object models have been assumed, which makes the spatio-temporal reasoning quite general. Significantly, the quantitative computation with qualitative reasoning in each stage of estimation. Using moving constellation as a focus of attention and using the constellation history for spatio-temporal reasoning has made our approach valuable.

A qualitative reasoning approach for monocular motion and depth estimation has been disclosed. The quantitative computation in each estimation process has been minimized. The experimental result is a powerful approach, which as presented, can handle multiple moving objects and some overlapping objects. A qualitative motion estimation process has been analyzed. The background and objects in the image have been selected as motion perception primitives. A moving constellation mechanism for has been utilized for fovea locking. A perspective compensation algorithm and a background recovery algorithm are herein disclosed. Spatio-temporal reasoning based on constellation history has been generalized for motion estimation, regardless of object size and velocity. At the same time, the integration of focus of attention into a qualitative reasoning has been achieved.

It is clear that the steps of the present method are intended for implementation with the aid of a programmable computer and are obviously not intended to be understood as mere "mental steps". The computational steps in the claims are intended to be so understood and interpreted.

While the present invention has been explained by way of exemplary embodiment, it will be apparent to one of skill in the art to which it pertains that various changes and modifications can be made without departing from the spirit and scope of the invention, which is defined by the claims following.

For example, the use of a circumscribing rectangle to describe a moving constellation is an overestimate. A more precise description of the constellation, in the form of a closed irregular polygon or difference image with threshold is a possible alternative.

We claim:

1. A process for continuous background image recovery in an image sequence of a moving object, said process comprising the steps performed on images of said sequence of:
    providing a monocular device;
    inputting said image sequence, via said monocular device, wherein said image sequence contains a moving object moving with respect to a background;
    identifying at least one region associated with the moving object in said image sequence, wherein said moving object is identified relative to the background;
    deriving a moving constellation containing said at least one region, and defining said moving constellation in a minimum circumscribing polygon;
    deriving partial background images associated with respective positions of said moving constellation; and
    combining said partial background images to create a recovered image corresponding in shape and position to said moving constellation.

2. A process for background information recovery in accordance with claim 1 wherein said said at least one region of said moving object are identified by comparing differences between successive images in said image sequence.

3. A process for background information recovery in accordance with claim 2 wherein said partial background images are derived by selecting regions outside of said circumscribing polygon.

4. A process for background information recovery in accordance with claim 1 wherein said circumscribing polygon is substantially rectangular.

5. A process for background information recovery in accordance with claim 1 further including the step of deriving the relative depth of said moving object with respect to the background by the first derivative of the size associated with said moving constellation.

6. A process for background information recovery in accordance with claim 1 further including the step of determining a velocity associated with said moving object by analyzing a perspective compensated image of said moving object.

7. A process for background image recovery in accordance with claim 1 further comprising the steps of:
    (1) estimating depth z with the equation $$1/(z-kw_i)=l_i/f,$$

wherein T is a threshold value indicative to a minimum number of pixels associated with a display, k is a derived constant for three consecutive equations, l is the length, f is the monocular device focal length and $w_i$ is the change in z with respect to a change in time, if $1/1_{i+1} \geq T$, the threshold value (T), is the number of pixels which a system requires as a minimum difference in pixels;

(2) deriving a rough depth estimation and z component velocity estimation using three consecutive frames or every second three frames;

(3) compensating perspective distortion for x, y in an image in said image sequence and (4) determining x, y velocity components compared to a previous frame in said image sequence.

8. A process for background image recovery in accordance with claim 7 further including the step of determining said threshold value as a function of a line size change in frames of said image sequence.

9. A process for background image recovery in an image sequence of a moving object, said process comprising the steps of:

providing a monocular device for providing said image sequence;

inputting said image sequence, via said monocular device, wherein said image sequence contains a moving object moving with respect to a background;

identifying at least one region associated with the moving object in said image sequence, wherein said moving object is identified from the background;

deriving a moving constellation containing said at least one region, and defining said moving constellation in a minimum circumscribing polygon;

deriving partial background images associated with respective positions of said moving constellation; and combining said partial background images to derive said background to be recovered; and wherein a background image is recursively obtained and updated in accordance with the algorithm:

$$Mc_i = Rm\tau(I_i - I_{(i-1)})$$

$$Bg_0 = I_0$$

$$Bg_i = Bg_{(i-1)} \cup_r (I_i - Mc_i)$$

$$Bg_{unknown} = \cap_{sub\{i=0..n\}} Mc_i$$

where $I_i$ denotes input image, $Rm\tau$ is a minimum rectangle operator and $Mc_i$ is a moving constellation at the ith frame.

10. A process for background image recovery in an image sequence having a plurality of frames, comprising the steps of:

providing an optical device for producing said image sequence;

inputting said image sequence, via said optical device, wherein said image sequence contains a moving object moving with respect to a background;

taking two consecutive frames associated with said image sequence into an image buffer storage continuously at a general video frame rate and storing two consecutive frames;

deriving an intensity difference frame from said two consecutive frames;

binarizing said intensity difference frame to get a bounding box frame;

forming a bounding box in a binarized frame by forming horizontal and vertical projections and thresholding both ends of said bounding box to get boundaries of said bounding box by utilizing a threshold value dependent upon the size of a moving object contained in said image sequence;

deriving a partial background frame from a frame associated with said bounding box, wherein regions within the bounding box, except for a region of said bounding box constitute a recovered static background; and overlapping each partial background frame to the background frame to be recovered, thereby incrementally recovering and updating the background every frame.

11. A process for background image recovery in an image sequence having a plurality of frames, wherein said image sequence includes an image of a moving object, comprising the steps of:

providing an optical device for producing said image sequence;

inputting said image sequence, via said optical device, wherein said image sequence contains a moving object moving with respect to a background;

storing consecutive frames of said plurality of frames including therein said image of the moving object;

deriving difference frames from said consecutive frames;

deriving a bounding box frame from each difference frame;

deriving a partial background frame from each bounding box frame wherein said partial background frame excludes an area within a bounding box; and overlapping said partial background frames for providing said backgrounds information to be recovered.

12. A process for continuous background image recovery from a sequence of images with moving objects, comprising inputting a sequence of images of a background and a moving object, followed by the steps performed on images of said sequence of:

a) identifying regions of moving objects relative to the background;

b) deriving a moving constellation containing moving objects in a minimum circumscribing polygon;

c) deriving partial background images associated with respective positions of said moving constellation;

d) combining a plurality of said partial background images; and e) utilizing background images obtained in step d) for the background of step a).

13. A process for background image recovery in accordance with claim 12 wherein said regions of moving objects are identified by deriving difference images between an input image with moving objects and a background image obtained by the steps of claim 1.

14. A process for background image recovery in accordance with claim 13 wherein said partial background images are derived by selecting regions outside of said circumscribing polygon and overlapping onto the previously recovered background image.

15. A process for background image recovery in accordance with claim 12 wherein said circumscribing polygon is a rectangle.

16. A process for background image recovery in accordance with claim 12 wherein a depth of said moving object is obtained from the first derivative of size of said image of said moving object and the image of said moving object is obtained from a sequence of input images and the corresponding recovered background images.

17. A process for background image recovery in accordance with claim 12 wherein a velocity of said moving object is obtained from a perspective compensated image of said object and the image of said object is obtained from a sequence of input images and the corresponding recovered background images.

18. A process for continuous background image recovery from a sequence of images including an image of a moving object, comprising inputting a sequence of images containing a background and a moving object, followed by the steps performed on said image of:

a) identifying regions of moving objects from the background;

b) deriving a moving constellation containing moving objects in a minimum circumscribing polygon;

c) deriving partial background images associated with respective position of said moving constellation; and d) combining a plurality of said partial background images to derive said background to be recovered and wherein a background image is recursively obtained and updated in accordance with the algorithm:

$$Mc_i = Rm\tau(I_i - I_{(i-1)})$$

$$Bg_0 = I_0$$

$$Bg_i = Bg_{(i-1)} \cup_r (I_i - Mc_i)$$

$$Bg_{unknown} = \cap_{sub(i=0..n)} Mc_i$$

wherein $I_i$ denotes input image and $Mc_i$ is a moving constellation the ith frame.

* * * * *